United States Patent
Deng et al.

(10) Patent No.: US 8,983,765 B2
(45) Date of Patent: Mar. 17, 2015

(54) METHOD AND SYSTEM FOR LANE CENTERING CONTROL

(75) Inventors: Weiwen Deng, Rochester Hills, MI (US); Yong H. Lee, Troy, MI (US); Haicen Zhang, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 1932 days.

(21) Appl. No.: 11/548,293

(22) Filed: Oct. 11, 2006

(65) Prior Publication Data

US 2008/0091318 A1    Apr. 17, 2008

(51) Int. Cl.
G06F 19/00    (2011.01)
B62D 6/00    (2006.01)
G05D 1/00    (2006.01)
A01B 69/00    (2006.01)

(52) U.S. Cl.
USPC ............... 701/301; 701/32; 701/33; 701/205; 701/41

(58) Field of Classification Search
USPC ........... 701/1, 32, 33, 36, 37, 41, 93, 70, 301, 701/205; 180/168, 167, 169; 340/435, 436, 340/901
See application file for complete search history.

(56) References Cited

U.S. PATENT DOCUMENTS

| | | | | |
|---|---|---|---|---|
| 5,913,375 | A * | 6/1999 | Nishikawa | 180/168 |
| 6,018,692 | A * | 1/2000 | Shimizu et al. | 701/41 |
| 6,338,015 | B1 * | 1/2002 | Kawagoe et al. | 701/41 |
| 6,401,024 | B1 | 6/2002 | Tange et al. | 701/96 |
| 6,536,549 | B2 * | 3/2003 | Kreuzer | 180/169 |
| 7,162,333 | B2 * | 1/2007 | Koibuchi et al. | 701/1 |
| 7,236,884 | B2 * | 6/2007 | Matsumoto et al. | 701/300 |
| 7,613,568 | B2 * | 11/2009 | Kawasaki | 701/301 |
| 2001/0018641 | A1 * | 8/2001 | Kodaka et al. | 701/301 |
| 2002/0007239 | A1 | 1/2002 | Matsumoto et al. | 701/41 |
| 2002/0087255 | A1 | 7/2002 | Jindo et al. | 701/96 |

* cited by examiner

Primary Examiner — Ronnie Mancho
(74) Attorney, Agent, or Firm — Cantor Colburn LLP

(57) ABSTRACT

A system for lane centering control for a vehicle having a user-operable steering device is disclosed. The system includes a set of sensors for sensing the vehicle speed, yaw rate, and steering device angle, a target path tracker configured for tracking the target path of the vehicle, a processor responsive to the set of sensors for predicting the path of the vehicle, a controller responsive to the set of sensors, the target path tracker, and the processor, and productive of a lane centering control signal, and an active front steering actuator responsive to the control signal and productive of steering assistance to the steering device. The controller includes a processing circuit responsive to executable instructions for producing the steering assistance to the steering device to reduce a difference between the predicted path and the target path, thereby serving to maintain lane centering of the vehicle.

24 Claims, 7 Drawing Sheets

METHOD AND SYSTEM FOR LANE CENTERING CONTROL

BACKGROUND OF THE INVENTION

The present disclosure relates generally to a system and method for lane centering control for a vehicle having a user-operable steering device and a computer-controlled steering actuator.

Vehicle traveling control systems include such arrangements as: path-following control systems, lane-boundary-keeping control systems, steering-torque assist control systems, and steering-angle assist control systems. Such traveling control systems rely on a variety of sensors, controllers and actuators, and may include the utilization of a visual lane detection system. However, such systems typically rely on a mode of response directed to lane-boundary-keeping control, rather than a mode of response directed to lane-centering control, which would advantageously provide for less sideways variation of the vehicle within a traveled lane.

Accordingly, there remains a need in the art for a lane centering control system and method that provides proactive analysis to overcome these drawbacks.

BRIEF DESCRIPTION OF THE INVENTION

An embodiment of the invention includes a system for lane centering control for a vehicle having a user-operable steering device. The system includes a set of sensors for sensing the vehicle speed, yaw rate, and steering device angle, a target path tracker configured for tracking the target path of the vehicle, a processor responsive to the set of sensors for predicting the path of the vehicle, a controller responsive to the set of sensors, the target path tracker, and the processor, and productive of a lane centering control signal, and an active front steering actuator responsive to the control signal and productive of steering assistance to the steering device. The controller includes a processing circuit responsive to executable instructions for producing the steering assistance to the steering device to reduce a difference between the predicted path and the target path, thereby serving to maintain lane centering of the vehicle.

Another embodiment of the invention includes a method for lane centering control for a vehicle having a user-operable steering device, the vehicle being disposed to traverse a target path. The vehicle speed, yaw rate, and steering device angle is sensed, the target path of the vehicle is tracked, and the predicted path of the vehicle is sensed. In response to the sensed vehicle speed, yaw rate, and steering device angle, and in response to information relating to the target path and predicted path of the vehicle, a lane centering control signal is produced. In response to the lane centering control signal, an active front steering actuator is actuated to produce steering assistance to the steering device to reduce a difference between the predicted path and the target path, thereby serving to maintain lane centering of the vehicle.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention, as shown and described by the various figures and accompanying text, provides a system and method for lane centering control for a vehicle having a user-operable steering device, which is typically but not necessarily operated by the driver's hands, and a computer-controlled steering actuator. A target path tracker tracks the target path of the vehicle and provides target path information to a controller that is configured to determine a predicted path of the vehicle based on system inputs, to analyze the difference between the target path and the predicted path, and to provide to the driver of the vehicle with non-intrusive and predictive steering assistance during the course of path tracking. As used herein, the term non-intrusive means that the driver may readily, and without much effort, overcome the lane-centering-control steering assistance provided by an active front steering (AFS) actuator, which is provided via addition or subtraction of active steering to a driver's hand steering. While exemplary embodiments described herein depict a four-wheel vehicle as an exemplary vehicle, it will be appreciated that the disclosed invention is also applicable to other vehicles having any number of wheels, such as three-wheel vehicles or multi-wheel trucks, for example. While exemplary embodiments described herein depict a steering wheel as a device for steering the vehicle, it will be appreciated that the disclosed invention is also applicable to other steering devices, such as a joy stick for example.

Figure 1:
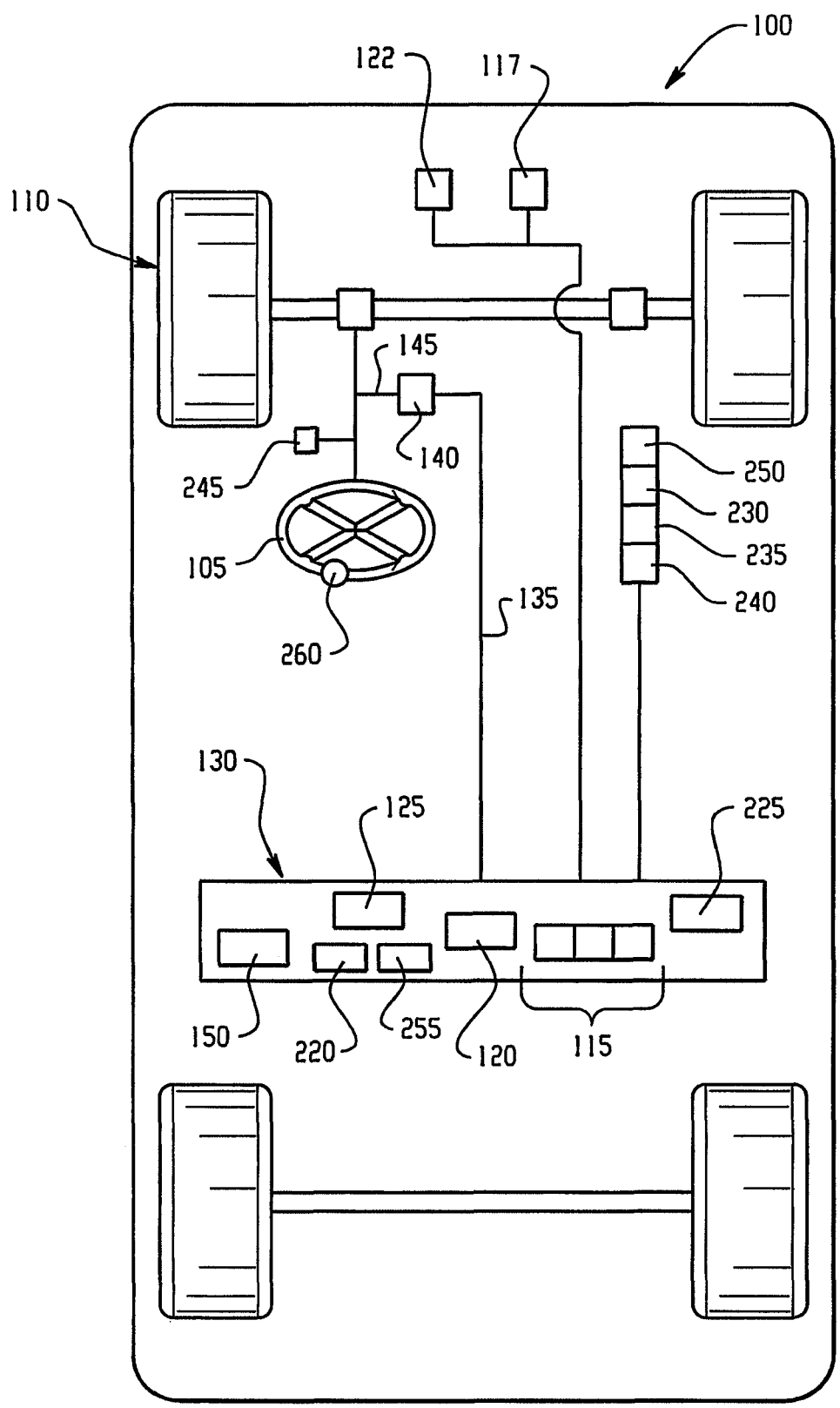
FIG. 1 depicts in schematic form an exemplary vehicle for use in accordance with an embodiment of the invention.
Figure 2:
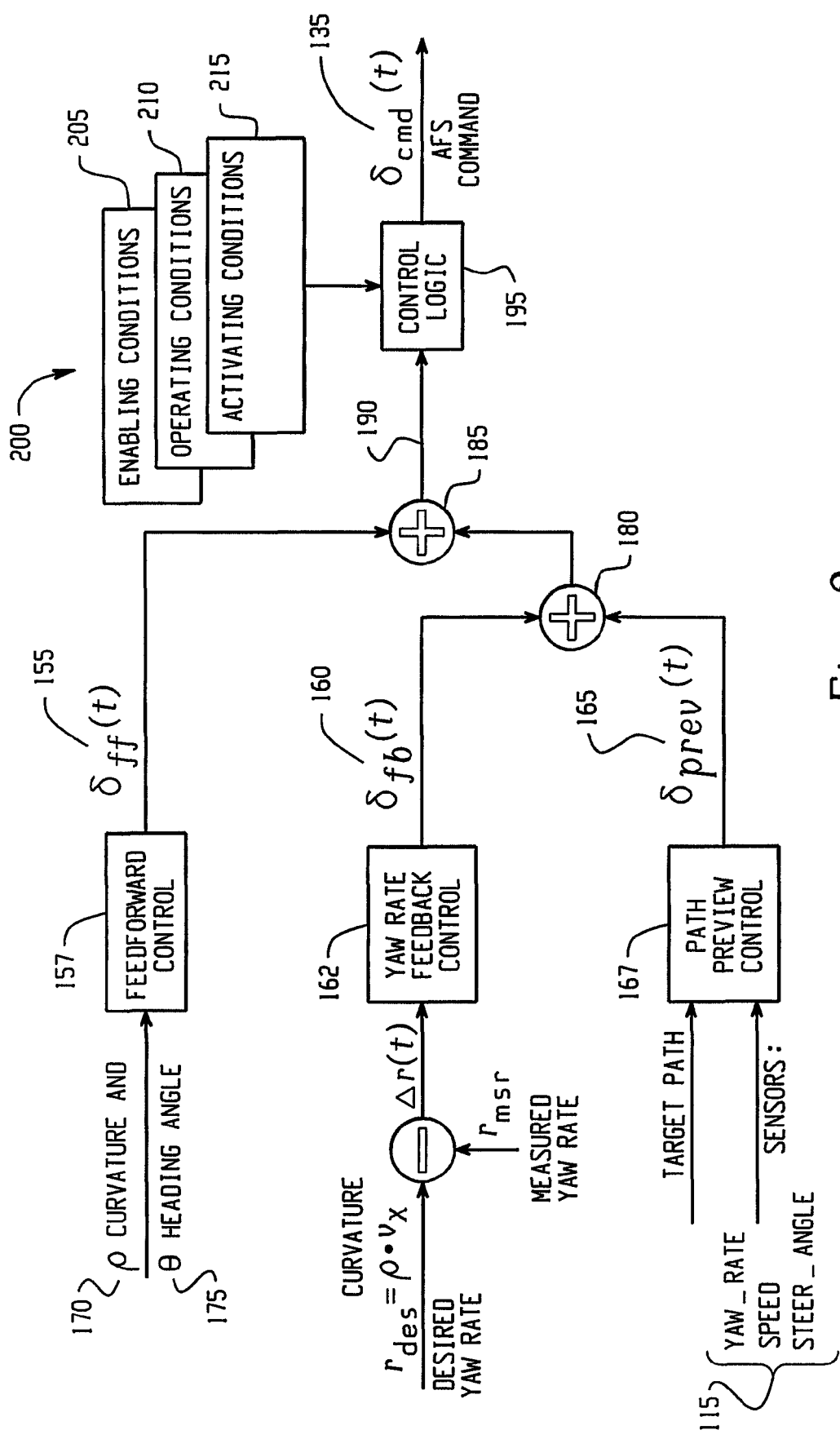
FIG. 2 depicts in block diagram form an exemplary control scheme in accordance with an embodiment of the invention.
Figure 4:
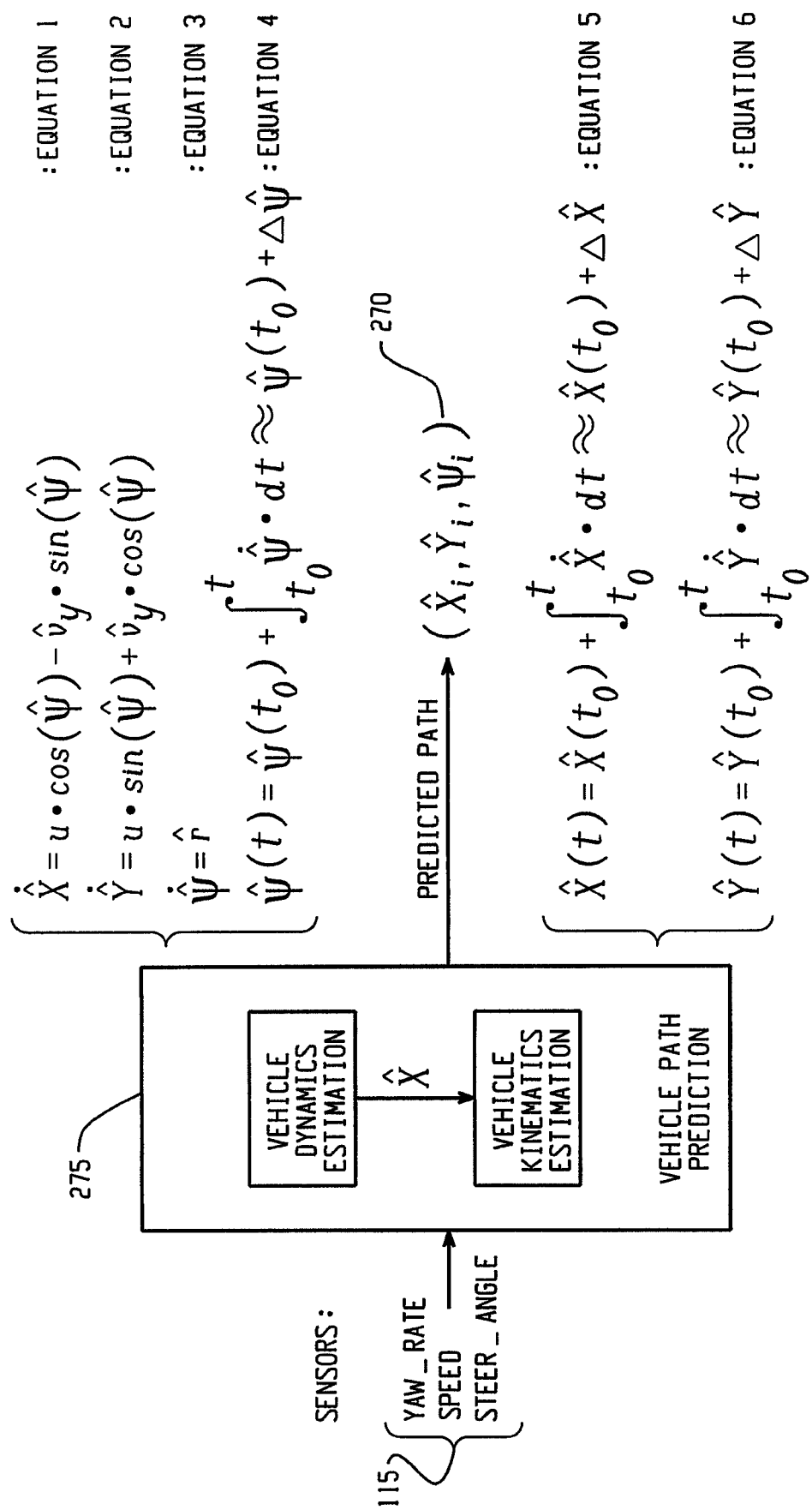
FIGS. 4-6 depict in block diagram form exemplary control schemes in accordance with an embodiment of the invention.
Figure 5:
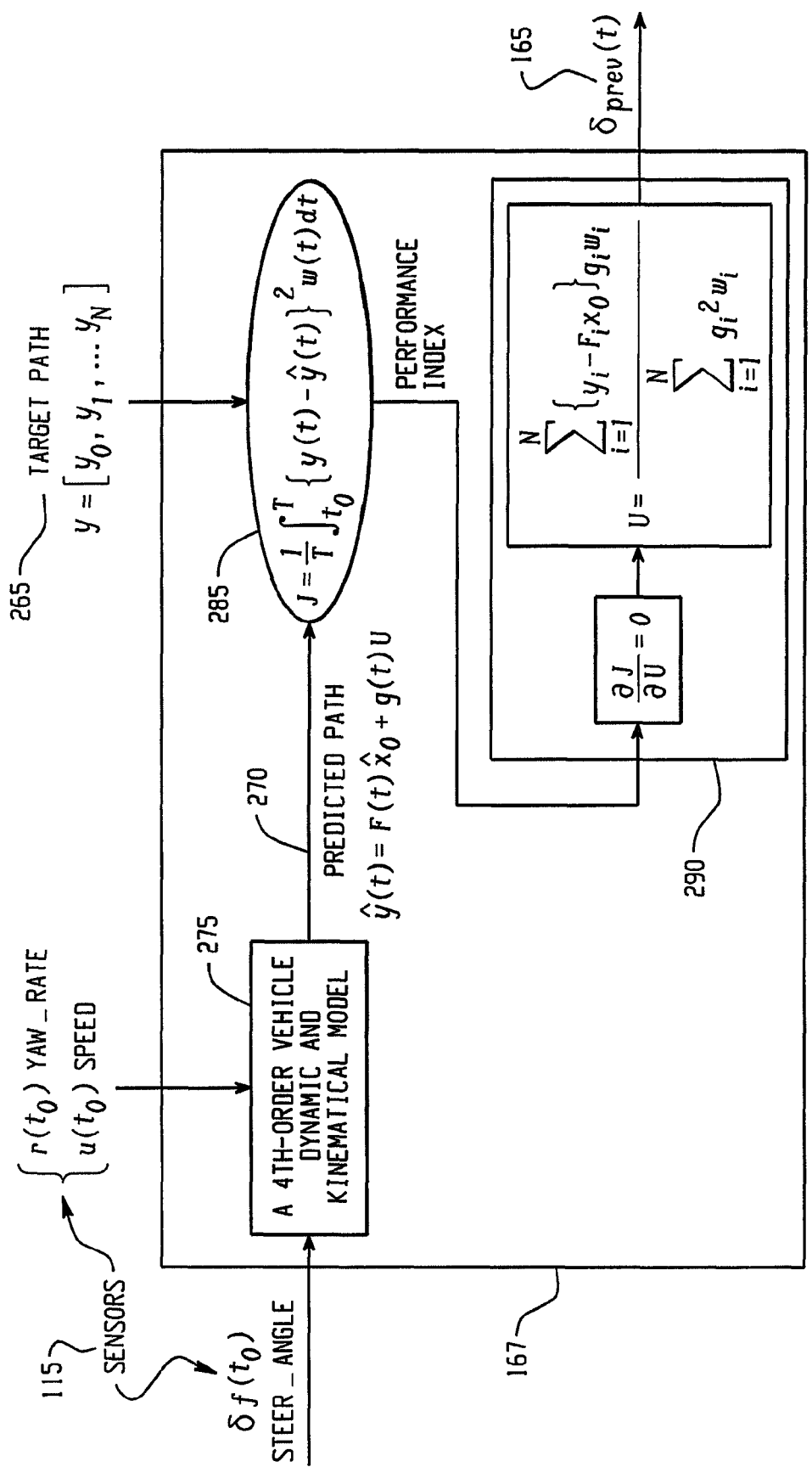
Figure 6:
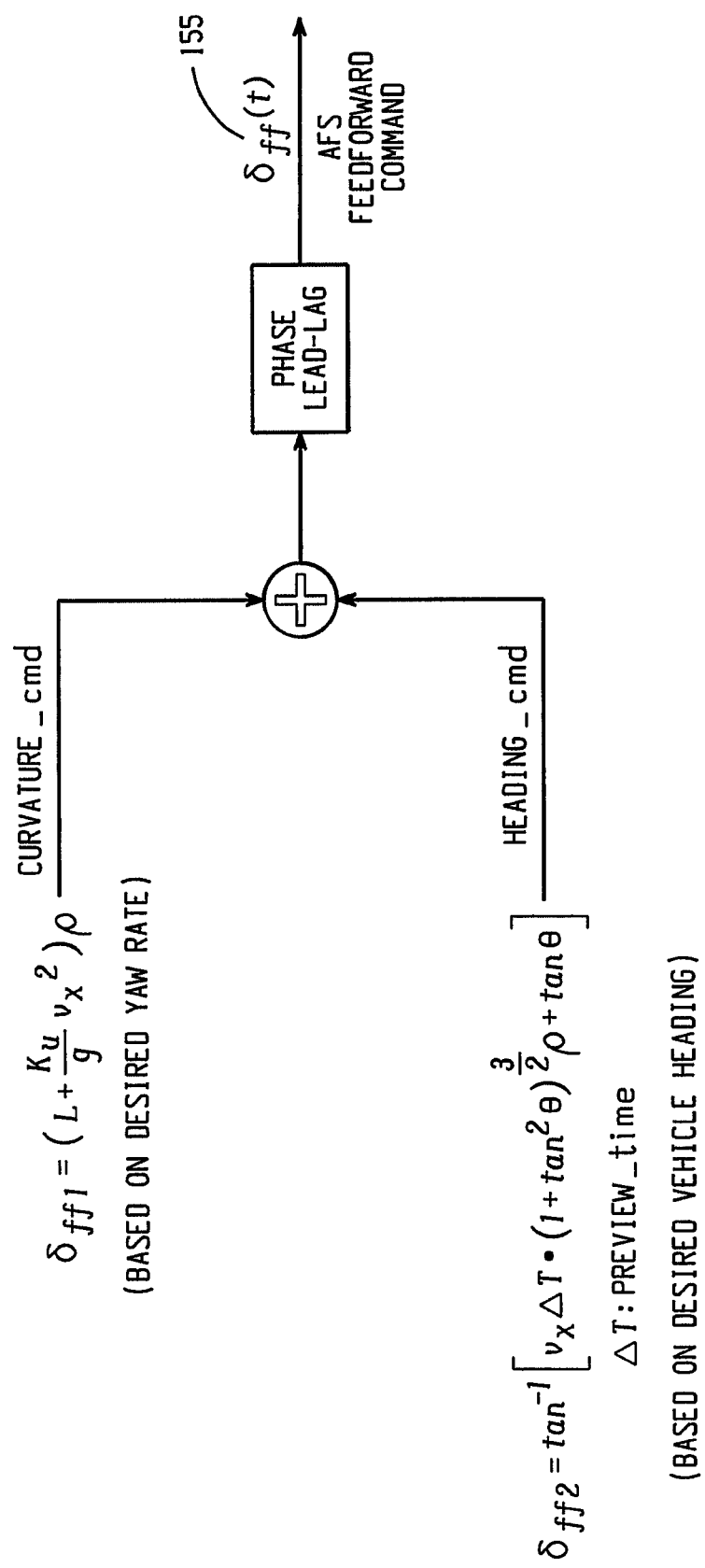

For an appreciation of the invention disclosed herein, the nomenclature for the symbols used herein will first be provided as follows:

(the following variables are illustrated in FIG. 2):
$\rho$ road curvature
$\theta$ vehicle heading angle with respect to lane center line
$\delta_{ff}$ steering feedforward control command
$\delta_{fb}$ steering yaw rate feedback control command
$\delta_{prev}$ steering control command based on path preview
$\delta_{cmd}$ total steering control command
$r_{des}$ vehicle desired yaw rate
$r_{msr}$ vehicle measured yaw rate
$\Delta r$ yaw rate error between desired and measured values
$v_x$ vehicle longitudinal speed
(the following variables are illustrated in FIG. 4):
$X$ longitudinal distance of predicted path
$\Delta \hat{X}$ a longitudinal integration step
$\hat{Y}$ lateral offset of predicted path
$\Delta \hat{Y}$ a lateral integration step
$\psi$ vehicle yaw angle of predicted path
$\Delta \psi$ a vehicle yaw angle integration step
$u$ vehicle longitudinal speed
$\hat{v}_y$ estimated vehicle lateral speed
$\hat{r}$ estimated vehicle yaw rate
$\hat{x}$ estimated vehicle state variable
(the following variables are illustrated in FIG. 5):
$\delta_f$ steering wheel angle from sensor
$r$ vehicle yaw rate from sensor
$u$ vehicle longitudinal speed from sensor
$y_t$ lateral offset of target path ŷ lateral offset of predicted path
U control input vector
$w_t$ weighting factor
F function for free response
g(t) function for control response
T preview time
J performance index
(the following variables are illustrated in FIG. 6):
g gravity
L vehicle wheelbase
$K_u$ vehicle understeer coefficient Referring now to FIG. 1, an exemplary embodiment of a vehicle 100 having a steering wheel 105 (also herein referred to as a steering device) operably connected to the front wheels 110 of the vehicle 100 is depicted. A set of sensors 115 for sensing the vehicle speed, yaw rate, and steering device angle are configured and disposed appropriately within the vehicle 100 for their respective sensing purposes. A lane sensor 117 for providing information with respect to vehicle fixed coordinates, such as road curvature ρ170, vehicle heading angle θ175 (depicted in FIG. 2) and vehicle lateral displacement, is disposed toward the front of the vehicle 100. In an embodiment, the target path tracker is an algorithm stored in memory 120 that determines the vehicle target path based on lane sensor input along with other available systems if any, such as a vision or radar system 122, a map database with a global positioning system sensor. In an embodiment, lane sensor 117 and vision/radar system 122 are integrally arranged. Accordingly, lane sensor 117 may be considered to be a general lane sensing device to detect the target path, which may be expanded in function to include or incorporate other possible sensing devices, such as the vision/radar system 122, map database with a global positioning system sensor, or other sensor systems suitable for the purposes disclosed herein. A processor 125 is configured and disposed to be responsive to the set of sensors 115 for predicting the path of the vehicle. A controller 130 is configured and disposed to be responsive to the set of sensors 115, the target path tracker, and the processor 125, and to be productive of a lane centering control signal 135. An active front steering (AFS) actuator 140 is configured and disposed to be responsive to the control signal 135 and productive of steering assistance 145 to the steering device 105. The controller 130 includes a processing circuit 150 that is configured and disposed to be responsive to executable instructions for producing the steering assistance 145 to the steering device 105 to reduce a difference between the predicted path and the target path, thereby serving to maintain lane centering of the vehicle. In an embodiment, processor 125 and processing circuit 150 are integrally arranged.

Referring now to FIG. 2, the control signal $\delta_{cmd}(t)$ 135 is responsive to a feedforward control signal $\delta_{ff}(t)$ 155 for quick response, a yaw rate feedback control signal $\delta_{fb}(t)$ 160 for yaw rate disturbance rejection and stability, and a path preview control signal $\delta_{prev}(t)$ 165 for smooth path tracking. The feedforward control signal 155 provided by feedforward control block 157 is based on a sensed curvature ρ of the target path 170 and a sensed heading angle θ175 provided by the target path tracker via the lane sensor 117. The yaw rate feedback control signal 160 provided by feedback control block 162 is based on the desired yaw rate $r_{des}$, from the sensed curvature ρ of the target path and the longitudinal velocity $v_x$ of the vehicle, and the measured yaw rate $r_{msr}$, to provide the yaw rate error Δr between desired and measured values. The path preview control signal 165 from path preview control block 167 is based on information from the set of sensors 115, and lane centerline information relating to the target path from the target path tracker. Integrators 180 and 185 combine the control signals as illustrated in FIG. 2, and provide a pre-output signal 190 to a control logic block 195, which is also responsive to a set of conditional control signals 200 for controlling the operability of the control signal 135. In an embodiment, the set of conditional control signals 200 include signals responsive to enabling conditions 205, signals responsive to operating conditions 210, signals responsive to activating conditions 215, or a combination having at least one of the foregoing conditions.

In an embodiment, the vehicle 100 may also include an adaptive cruise control 220 for providing cruise control to the vehicle, a lane departure warning (LDW) apparatus 225 for providing a warning signal indicative of the vehicle departing from a lane centering control condition, a first switch 230 for enabling the lane centering control signal 135, a second switch 235 for enabling the adaptive cruise control 220, and a third switch 240 for enabling the lane departure warning apparatus 225. In an embodiment, adaptive cruise control 220 is a processor-based control integral with controller 130. In another embodiment, the vehicle 100 also includes a turn signal switch 245 and a brake switch 250, and if equipped, the status of an anti-lock brake system (ABS), a traction control system (TCS) and a vehicle stability control system (VSCS), depicted generally by reference numeral 255 in controller 130, and each of which being known generally in the art.

In an embodiment, an exemplary set of the enabling conditions 205 includes all of the following: detection of a request by a user to enable the lane centering control signal 135; detection of a request by a user to enable the adaptive cruise control 220 of the vehicle; detection of a request by a user to enable the lane departure warning apparatus 225; and, detection that all input signals, such as signals from the set of sensors 115 and the lane sensor 117, to the controller 130 are normal.

In an embodiment, an exemplary set of the operating conditions 210 includes all of the following: detection by the controller 130 of the lane departure warning apparatus 225 being engaged; detection by the controller 130 of the adaptive cruise control 220 being engaged; detection by the controller 130 of the vehicle speed being within a defined range; detection by the controller 130 of the vehicle longitudinal acceleration and lateral acceleration being less than defined values; detection by the controller 130 of the target path curvature ahead being greater than a defined value; detection by the controller 130 of the status of the anti-lock brake system, the traction control system and the vehicle stability control system 255 being disengaged, if equipped; and, detection by the controller 130 of the driver's hands being on the steering device, which may be provided by a tactile sensor 260 disposed on the steering wheel 105. In an embodiment, when any one of the control systems is detected to be active, the lane centering control is disabled.

In an embodiment, an exemplary set of the activating conditions 215 includes all of the following: detection by the controller 130 of the turn signal switch 245 being off; detection by the controller 130 of the brake switch 250 being off; detection by the controller 130 of the steering device angle being less than a defined value; and, detection by the controller 130 of the steering device rate of change of angle being less than a defined value.

In view of the foregoing description of a system for lane centering control, it will be appreciated that a method for lane centering control is also within the scope of the claimed invention, which will now be discussed in more detail.

Figure 3:
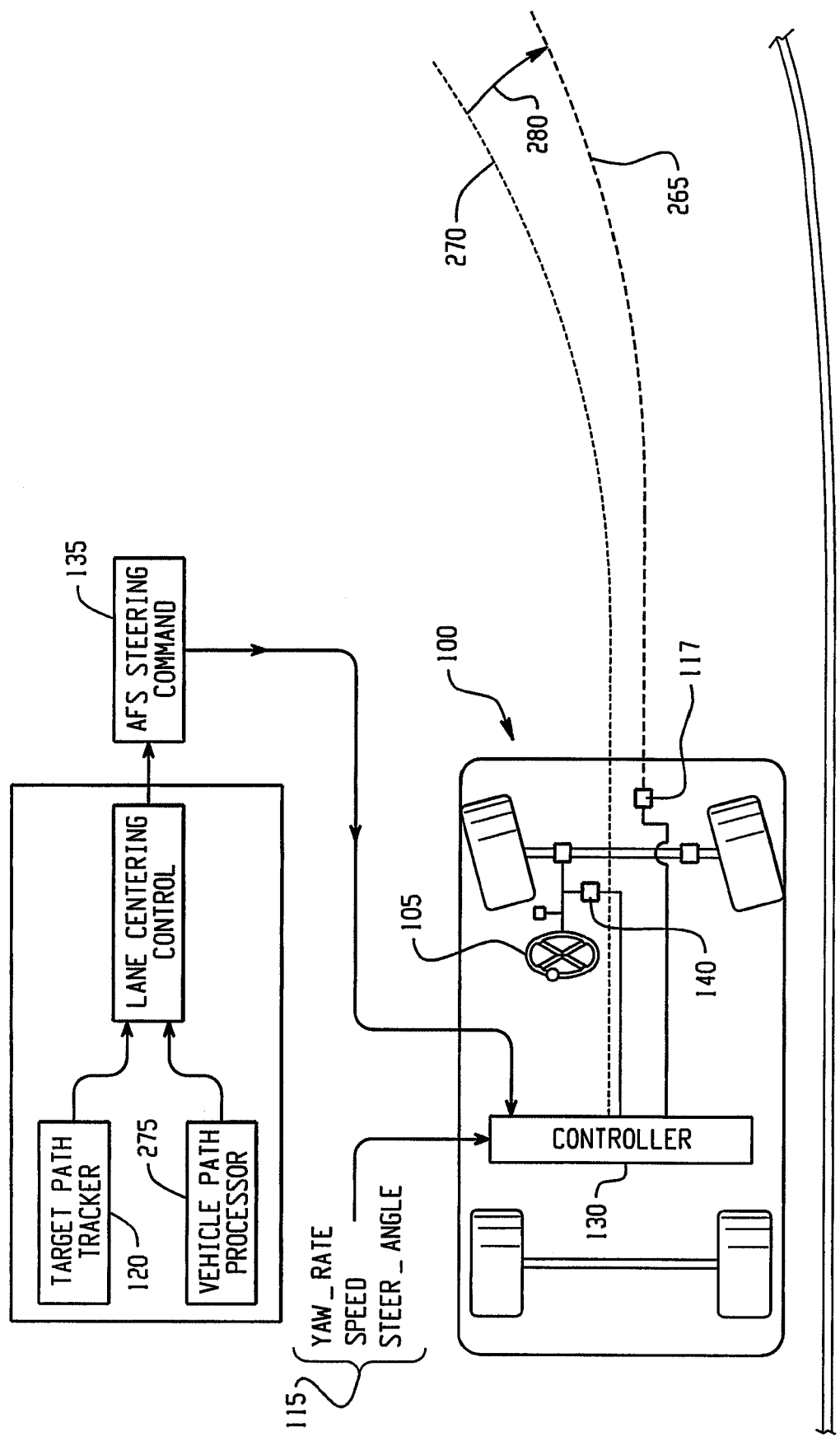
FIG. 3 depicts in block diagram form an implementation of an embodiment of the invention.

With reference to FIG. 3, the vehicle speed, yaw rate, and steering device angle are sensed via sensors 115, the target path 265 of the vehicle 100 is tracked via the target path tracker based on input from heading angle θ175 the lane sensor 117, and the predicted path 270 is predicted by a prediction path processor 275, which is part of the controller 130 and is illustrated in a more detailed block diagram in FIG. 4 (discussed further below). In response to the sensed vehicle speed, yaw rate, and steering device angle, and in response to information relating to the target path and predicted path of the vehicle, the controller 130 produces a lane centering control signal 135, and in response to the lane centering control signal, the active front steering actuator 140 is actuated to produce steering assistance to the steering device 105 in a direction to assist in reducing a difference between the predicted path and the target path, illustrated generally by arrow 280, thereby serving to maintain lane centering of the vehicle.

The logic flow within controller 130 for producing the lane centering control signal 135 has been described above in reference to FIG. 2, and reference should be made thereto for its applicability to the disclosed method.

Referring now to FIG. 4, prediction path processor 275 receives inputs from the set of sensors 115, performs vehicle dynamics estimation via Equations 1-4 illustrated in FIG. 4 (see nomenclature provided above), performs vehicle kinematics estimation via Equations 5-6 illustrated in FIG. 4, and provides as output values for establishing the predicted path 270 in terms of: the longitudinal distance of the predicted path ($\hat{X}$); the lateral offset of the predicted path ($\hat{Y}$); and, the vehicle yaw angle of the predicted path ($\psi$). The predicted path information is employed by the path preview control block 167 in FIG. 2 for establishing the path preview control signal 165. Referring now to FIG. 5, which illustrates a more detailed view of the path preview control block 167, information relating to the predicted path 270 is compared with information relating to the target path 265, and then entered into an algorithm 285 to determine a performance index J, which is a function of the lateral offset of the target path (y), the lateral offset of the predicted path (y-hat), a weighting factor (w), and a preview time (T), integrated over time (t). The performance index is then entered into a second algorithm 290 to determine a control input vector U, which is responsive to a free response function F(t) and a control response function g(t), and to provide the path preview control signal 165.

With regard to the information relating to the target path 265, target path tracker processes input information to either approximate the target path 265 via a parabolic curve calculation, or to determine the curvature ρ170 of the lane ahead and the heading angle (or angle to lane) θ175.

In a first embodiment, a lane sensing system (alternatively referred to as a vision sensor or vision sensing system), available from a prior art, provides as input information the left and right lateral offset of the lane $\zeta_L$ and $\zeta_R$, the angle to lane (or heading angle) θ, and the curvature of the lane ρ. Target path tracker then approximates the target path 265 as a parabolic curve according to the equation:

$$y_t = ax^2 + bx + c$$

where:

$$a = (\rho/2)(1+\tan^2\theta)^{(3/2)}$$

$$b = \tan\theta$$

$$c = (\frac{1}{2})(\zeta_L - \zeta_R)$$

x represents the longitudinal distance of the target path, and $y_t$ represents the lateral offset of the taget path.

In a second embodiment, another lane sensing system (alternatively referred to as a vision sensor or vision sensing system), available from a prior art, provides as input information coefficients for a parabolic curve that approximates the target path 265. Here, the parabolic curve, and resulting heading angle θ and lane curvature ρ are given by:

$$y_t = ax^2 + bx + c$$

where:

$$\rho = (2a)/(1+b^2)^{(3/2)}$$

$$\theta = \tan^{-1}(b)$$

Referring now to FIG. 6, the input/output parameters for the feedforward control signal 155 are illustrated in more detail. Here, a first feedforward command $\delta_{f\!f1}$ is determined based on the road curvature ρ, the vehicle wheelbase L, a vehicle understeer coefficient $K_u$, the vehicle longitudinal speed $v_x$, and the value of gravity g, according to the equation illustrated in FIG. 6, and a second feedforward command $\delta_{f\!f2}$ is determined based on the heading angle θ, the road curvature ρ, the vehicle speed $v_x$, and the preview time ΔT, according to the equation illustrated in FIG. 6. The resulting feedforward control signal 155 is utilized by means of the control logic of FIG. 2 to determine the lane centering control signal 135.

Figure 7:
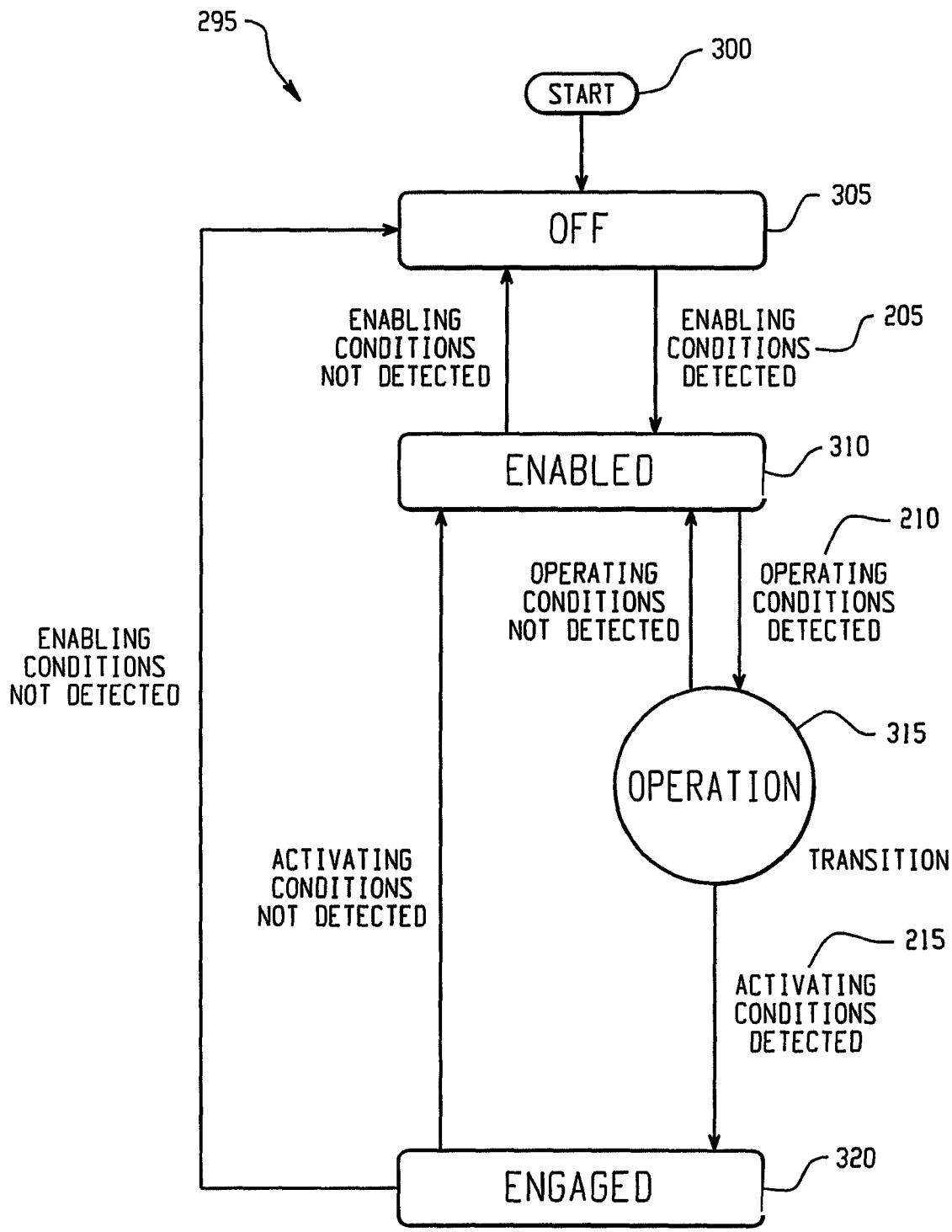
FIG. 7 depicts in flow diagram form an exemplary logic state flow diagram responsive to conditional control signals in accordance with an embodiment of the invention.

Referring now to FIG. 7, a state flow diagram 295 is illustrated that represents the effect of the conditional control signals on the enabling/disabling and activating/deactivating of the lane centering control signal 135. Beginning at the start 300 and working down (the right side) of the state flow diagram 295, the lane centering control system is initially off 305 until the aforementioned enabling conditions 205 are enabled, the aforementioned operating conditions 210 are detected, and the aforementioned activating conditions 215 are detected, at which time the lane centering control system is engaged 320. Starting at the engaged block 320 of the state flow diagram and working up, in response to the controller 130 not detecting the appropriate enabling conditions, the lane centering system and signal 135 is turned off 305. In response to the controller 130 not detecting the appropriate activating conditions, the logic state moves to the enabled block 310, and in response to the controller not detecting the appropriate enabling conditions, the lane centering system and signal 135 is turned off 305. Starting at the operation connective junction 315 of the state flow diagram and working up, in response to the controller 130 not detecting the appropriate operating conditions, the logic state moves to the enabled block 310, and in response to the controller not detecting the appropriate enabling conditions, the lane centering system and signal 135 is turned off 305. While embodiments of the invention have been described and illustrated applying certain enabling, operating, and activating conditions, it will be appreciated that other and/or different conditions and combinations may be applied without detracting from the scope of the invention, and that such other conditions and combinations are intended to fall within the ambit of the invention disclosed herein.

From the foregoing, it will be appreciated that the logical calculations performed at the controller 130 for determining whether to engage or disengage the lane centering control signal 135, may also be based on certain threshold values for certain input parameters. For example, control signal 135 may only be engaged if the vehicle speed is within a defined range, the vehicle longitudinal acceleration and lateral acceleration are less than defined values, the target path curvature ahead is greater than a defined value, the steering device angle is less than a defined value, or the steering device rate of change of angle is less than a defined value. With such threshold conditions in place, the steering assistance can be disengaged so as not to conflict with obstacle-avoidance maneuvers.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to produce steering assistance to the steering wheel of a vehicle to reduce a difference between the predicted path and the target path, thereby serving to maintain lane centering of the vehicle.

As disclosed, some embodiments of the invention may include some of the following advantages: non-intrusive and predictive steering assistance provided to the driver; by utilizing an active front steering (AFS) actuator rather than a torque overlay device, such as electric power steering (EPS) actuator, less torque intrusion is felt by the driver; by adjusting system response threshold parameters, the lane centering control system can be extended for controls of lane-change or obstacle-avoidance maneuvers; utilization of an active front steering actuator for both stability control and lane centering; combined feedforward, feedback and preview-based controls to ensure fast and smooth lane centering response, in addition to yaw stability, and a lane centering control system that is directed to maintaining lane centering of the vehicle as opposed to maintaining the vehicle within a defined boundary, which could be large and result in undesirable swaying.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for lane centering control for a vehicle having a user-operable steering device, comprising:
    a set of sensors for sensing the vehicle speed, yaw rate, and steering device angle;
    a target path tracker configured for tracking the target path of the vehicle, wherein the target path is approximated by a polynomial equation having a first constant and a second constant, wherein the first constant is a function of a curvature of the lane ahead of the vehicle and the heading angle of the vehicle relative to the lane ahead, and wherein the second constant is a function of the heading angle of the vehicle relative to the lane ahead;
    a processor responsive to the set of sensors for predicting the path of the vehicle, wherein the set of sensors are disposed for establishing a predicted path of the vehicle;
    a controller responsive to the set of sensors, the target path tracker, and the processor, and productive of a lane centering control signal; and
    an active front steering actuator responsive to the control signal and productive of steering assistance to the steering device;
    wherein the controller comprises a processing circuit responsive to executable instructions for:
    producing the steering assistance to the steering device to reduce a difference between the predicted path and the target path, thereby serving to maintain lane centering of the vehicle.

2. The system of claim 1, wherein:
    the target path tracker comprises a vision system.

3. The system of claim 2, wherein:
    the target path tracker further comprises a radar system, a map database with a global positioning system sensor, or a combination of both.

4. The system of claim 1, wherein the control signal is responsive to a feedforward control signal based on a sensed curvature and a sensed heading angle of the target path.

5. The system of claim 4, wherein the control signal is responsive to a feedback control signal based on a sensed curvature of the target path.

6. The system of claim 5, wherein the control signal is responsive to a path preview control signal based on information from the set of sensors and information relating to the target path.

7. The system of claim 1, wherein the control signal is responsive to a set of conditional control signals for controlling the operability of the control signal.

8. The system of claim 7, wherein the set of conditional control signals comprises signals responsive to enabling conditions, operating conditions, activating conditions, or a combination comprising at least one of the foregoing conditions.

9. The system of claim 8, wherein the vehicle comprises an adaptive cruise control, a lane departure warning apparatus, a first switch for enabling the lane centering control signal, a second switch for enabling the adaptive cruise control, and a third switch for enabling the lane departure warning apparatus; and further wherein
    the enabling conditions comprises all of the following: detection of a request to enable the lane centering control signal; detection of a request to enable the adaptive cruise control of the vehicle; and, detection of a request to enable the lane departure warning apparatus.

10. The system of claim 8, wherein the vehicle comprises an adaptive cruise control, a lane departure warning apparatus, a first switch for enabling the lane centering control signal, a second switch for enabling the adaptive cruise control, and a third switch for enabling the lane departure warning apparatus; and further wherein:
the operating conditions comprises all of the following: detection of the lane departure warning apparatus being engaged; detection of the adaptive cruise control being engaged; detection of the vehicle speed being within a defined range; detection of the vehicle longitudinal acceleration and lateral acceleration being less than defined values; detection of the target path curvature ahead being greater than a defined value; and, detection of the user being in operable contact with the steering device.

11. The system of claim 10, wherein the vehicle further comprises at least one of an anti-lock brake system, a traction control system, and a vehicle stability control system; and further wherein:
the operating conditions comprises detection of the status of the at least one of an anti-lock brake system, a traction control system, and a vehicle stability control system being disengaged.

12. The system of claim 8, wherein the vehicle comprises a turn signal switch and a brake switch; and further wherein
the activating conditions comprises all of the following: detection of the turn signal switch being off; detection of the brake switch being off; detection of the steering device angle being less than a defined value; and, detection of the steering device rate of change of angle being less than a defined value.

13. A method for lane centering control for a vehicle having a user-operable steering device, the vehicle disposed to traverse a target path, the method comprising:
sensing via a set of sensors the vehicle speed, yaw rate, and steering device angle, the set of sensors being disposed for establishing a predicted path of the vehicle;
tracking the target path of the vehicle, wherein the target path is approximated by a polynomial equation having a first constant and a second constant, wherein the first constant is a function of a curvature of the lane ahead of the vehicle and the heading angle of the vehicle relative to the lane ahead, and wherein the second constant is a function of the heading angle of the vehicle relative to the lane ahead;
establishing the predicted path of the vehicle via a processor that receives input from the set of sensors;
in response to the sensed vehicle speed, yaw rate, and steering device angle, and in response to information relating to the target path and the predicted path of the vehicle, producing a lane centering control signal; and
in response to the lane centering control signal, actuating an active front steering actuator to produce steering assistance to the steering device to reduce a difference between the predicted path and the target path, thereby serving to maintain lane centering of the vehicle.

14. The method of claim 13, wherein the tracking comprises tracking the target path based on vision sensor.

15. The method of claim 14, wherein the tracking further comprises tracking the target path based on a radar system, a map database with a global positioning system sensor, or a combination of both.

16. The method of claim 13, wherein the producing a lane centering control signal comprises producing a lane centering control signal in response to a feedforward control signal based on a sensed curvature and a sensed heading angle of the target path.

17. The method of claim 16, wherein the producing a lane centering control signal further comprises producing a lane centering control signal in response to a feedback control signal based on a sensed curvature of the target path.

18. The method of claim 17, wherein the producing a lane centering control signal further comprises producing a lane centering control signal in response to a path preview control signal based on information from the set of sensors and information relating to the target path, the path preview control signal serving to provide smooth path tracking.

19. The method of claim 13, wherein the producing a lane centering control signal comprises producing a lane centering control signal in response to a set of conditional control signals for controlling the operability of the lane centering control signal, wherein the set of conditional control signals comprises signals responsive to enabling conditions, operating conditions, activating conditions, or a combination comprising at least one of the foregoing conditions.

20. The method of claim 19, wherein the enabling conditions comprises all of the following: detection of a request to enable the lane centering control signal; detection of a request to enable an adaptive cruise control of the vehicle; and, detection of a request to enable a lane departure warning apparatus of the vehicle.

21. The method of claim 19, wherein the operating conditions comprises all of the following: detection of a lane departure warning apparatus of the vehicle being engaged; detection of an adaptive cruise control of the vehicle being engaged; detection of the vehicle speed being within a defined range; detection of the vehicle longitudinal acceleration and lateral acceleration being less than defined values; detection of the target path curvature ahead being greater than a defined value; and, detection of the user being in operable contact with the steering device.

22. The method of claim 21, wherein the operating conditions further comprises detection of the status of at least one of an anti-lock brake system, a traction control system and a vehicle stability control system of the vehicle being disengaged.

23. The method of claim 19, wherein the activating conditions comprises all of the following: detection of a turn signal switch of the vehicle being off; detection of a brake switch of the vehicle being off; detection of the steering device angle being less than a defined value; and, detection of the steering device rate of change of angle being less than a defined value.

24. The system of claim 1, wherein the polynomial equation is defined by, $y_t = ax^2 + bx + c$, where:
x represents a longitudinal distance of the target path,
$y_t$ represents a lateral offset of the target path,
a is a function of the heading angle and the curvature of the lane ahead,
b is a function of the heading angle of the lane ahead, and
c is a function of left and right lateral offsets of the lane ahead.

* * * * *